Nov. 7, 1967   A. H. BEEBE, JR., ETAL   3,350,773
METHOD OF MAKING BEARINGS
Filed Sept. 11, 1963
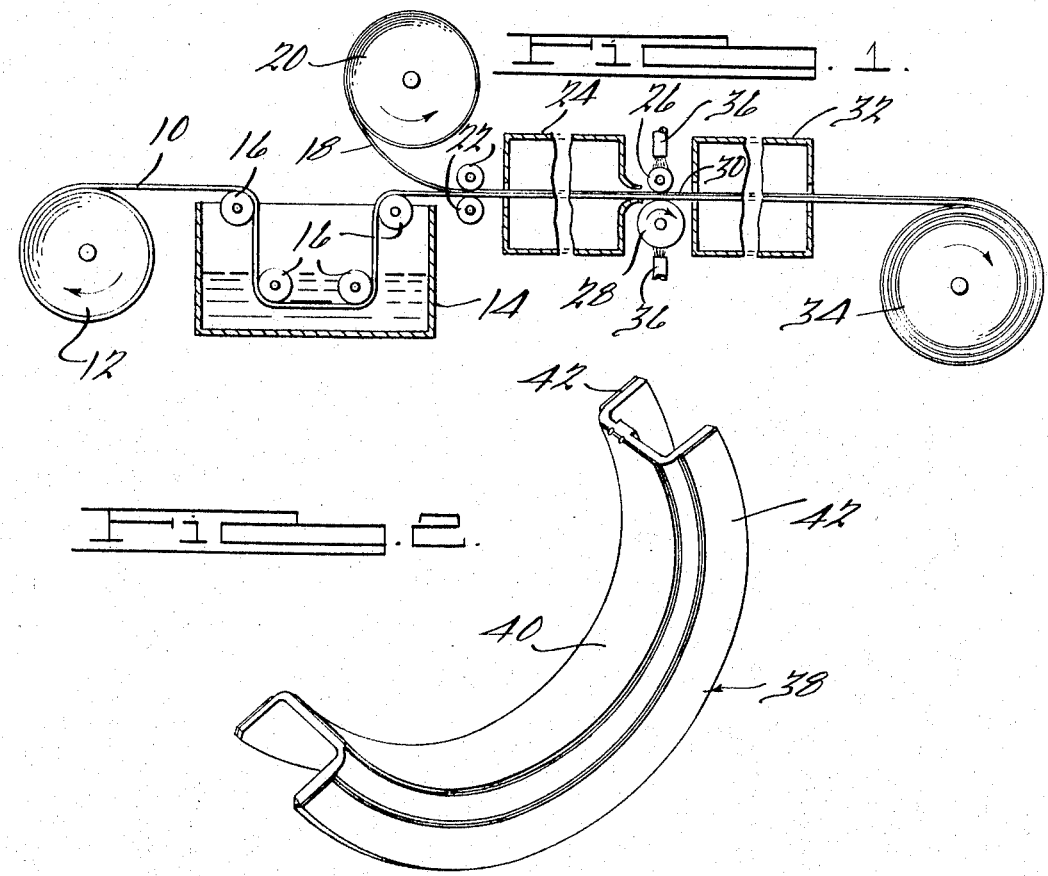
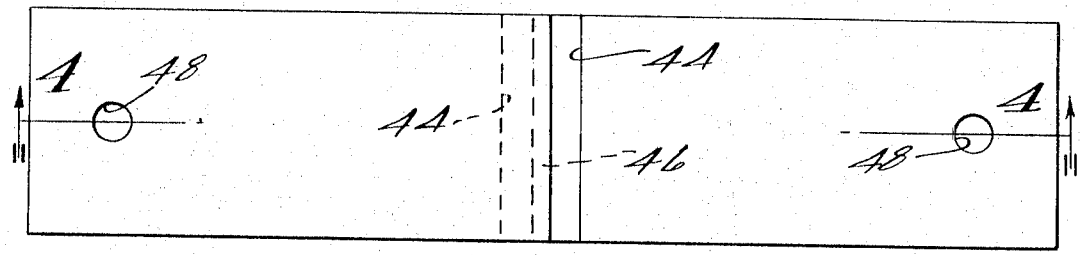
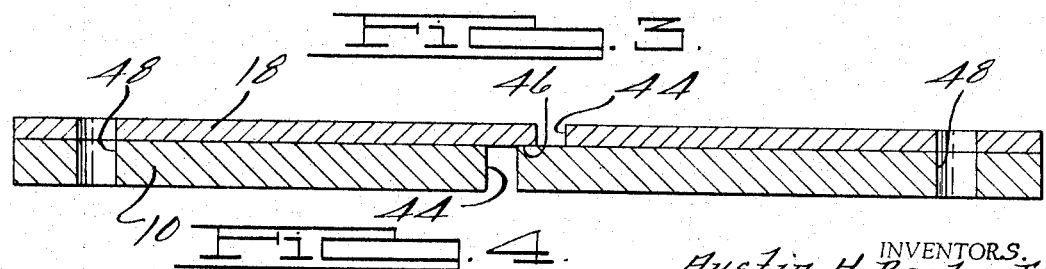
INVENTORS.
Austin H. Beebe, Jr.
Victor Gallatin
BY
Carvers, Dickey & Pierce,
ATTORNEYS.

United States Patent Office 3,350,773
Patented Nov. 7, 1967

3,350,773
METHOD OF MAKING BEARINGS
Austin H. Beebe, Jr., and Victor Gallatin, Ann Arbor, Mich., assignors to Federal-Mogul-Bower Bearings, Inc., Detroit, Mich., a corporation of Michigan
Filed Sept. 11, 1963, Ser. No. 308,268
2 Claims. (Cl. 29—492)

The present invention broadly relates to a method for forming a composite bimetallic aluminum and steel strip, and more particularly to an improved method of roll bonding aluminum to steel employing a cobalt interlayer forming more tenacious and uniform bonds between the two metal strips thereby enhancing the utility of the resultant strip for the fabrication of bearings and the like. The present invention is related to and comprises a further improvement over the process disclosed in United States Patent No. 3,078,563 issued Feb. 26, 1963 and assigned to the same assignee as the present invention.

Shell-type bearings comprising a hard metal backing strip such as steel having a bearing lining tenaciously bonded to the inner circumferential surface thereof are well known and in widespread commercial use. Bearings of this type wherein the bearing lining comprises aluminum or alloys of aluminum consisting predominantly of aluminum have been found to be particularly satisfactory because of their long fatigue life and high load carrying capacity in addition to their good corrosion resistance. Such bearings are most conveniently manufactured by first forming a composite strip comprising a steel backing strip having a layer of the aluminum or aluminum alloy thereon which is thereafter subjected to metal forming operations producing a bearing of the desired size and configuration. A variety of techniques have heretofore been used or proposed for use for forming such a composite strip including the casting of a molten aluminum or aluminum alloy on the surface of a steel strip or alternatively, roll bonding an aluminum strip to the steel strip effecting a solid phase welding therebetween in accordance with the teachings as set forth in the aforementioned United States patent.

In view of the difficulty in obtaining a satisfactory high strength bond between the aluminum or aluminum alloy to the steel surface due to the frequent formation of a brittle alloy composition at the interface, various techniques have heretofore been proposed including the deposition of a layer on the steel strip such as nickel, silver, copper or pure aluminum which in many instances has effected an improvement in the bond formed. The use of such an interlayer metal is believed to prevent the formation of substantially brittle iron-aluminum alloys which detract from the attainment of a bond of the requisite strength to enable subsequent severe deformation of the composite strip into a bearing of the desired configuration. While improvements in the bond strength in general have been obtained, it is particularly important in the high volume manufacture of bearings from a continuous composite strip, that the bond strength be consistently high, continuous and uniform over the entire interface between the steel and aluminum strips in order to assure uniform quality of the bearings produced therefrom. Inconsistencies and nonuniformity of the bond between the aluminum and steel strips derived from other processes heretofore known have resulted in problems in the manufacture of such shell-type bearings due to the partial separation of the aluminum and steel strips during drastic metal forming operations such as encountered in the manufacture of flanged shell-type bearings resulting in an uneconomical scrappage volume in addition to producing bearings which are inconsistent in their durability and performance due to variations and inconsistencies in their bond strength.

It is accordingly a principal object of the present invention to provide an improved method for manufacturing a composite aluminum or aluminum alloy and steel strip suitable for use in the manufacture of bearings and the like, wherein a controlled thickness of a cobalt interlayer is provided on the steel strip prior to roll bonding of the metals assuring consistency in the attainment of high strength uniform bonds across the entire faces of the two metal strips joined.

Another object of the present invention is to provide an improved method of roll bonding aluminum and aluminum alloys consisting predominantly of aluminum to a hard metal backing strip assuring the formation of tenacious bonds therebetween and which process is readily adapted for continuous operation providing optimum efficiency, versatility, and processing economy as well as producing a high quality composite strip which may thereafter be subjected to relatively drastic metal forming operations without encountering any separation of the two strips comprising the composite strip.

The foregoing and other objects and advantages of the present invention are based on the discovery that by applying a thin-plating of cobalt or cobalt-phosphorus of a thickness as low as about 0.000025 up to about 0.0005 inch on the face of the steel backing strip to be bonded to an aluminum strip or an aluminum-base alloy strip followed by a roll compacting of the two strips in superimposed relationship provides for a substantial improvement in the strength of the bond formed, and equally important provides for a consistency in the bond strength and assures uniformity thereof across the entire interface of the strips joined. In accordance with a second discovery comprising the present invention, it has been found that in bonding aluminum alloys containing a substantial quantity of a low melting point constituent that a substantial further improvement in the bond strength is obtained by subjecting the composite strip to a controlled heat treatment at a temperature ranging from about 600° F. to about 850° F. which concurrently provides for reticulation of the aluminum alloy.

Other objects, features and advantages of the present invention will become apparent from the subsequent description and the appended claims, taken in conjunction with the accompanying drawings, wherein:

FIGURE 1 is a schematic side elevational view illustrating a typical embodiment of a continuous process in accordance with the preferred practice of the present invention;

FIG. 2 is a perspective view of a flanged-type shell bearing half which is readily formed from the composite strip produced in accordance with the method illustrated in FIGURE 1;

FIG. 3 is a plan view of a typical tensile test specimen employed for determining the bond shear strength between the two strips joined, and FIG. 4 is a longitudinal sectional view of the tensile test specimen illustrated in FIGURE 3 and taken along the line 4—4 thereof.

The hard metal backing strip to which the aluminum or aluminum base alloy is tenaciously bonded may comprise any conventional mild steel such as SAE 1010 as well as SAE type 1020 or 1030 steels under conditions where a stiffer backing strip material is desired. In addition to conventional mild steels, suitable high-strength low alloy steels incorporating alloying constituents therein usually up to about 10% by weight are also frequently employed for this purpose.

The aluminum strip which comprises the bearing layer of the resultant bearing prepared from the bimetallic strip encompasses strips comprised of pure aluminum in addition to aluminum base alloys which predominate in aluminum such as alloys containing 3% cadmium, 1% copper, 1% nickel, and the balance aluminum; 4% silicon, 1% cadmium and the balance aluminum; low tin aluminum alloys conventionally containing from about 5% to about 7% tin, 1% copper, 1.5% silicon, .5% nickel and the balance aluminum; as well as high tin containing aluminum alloys containing from about 15% to about 30% tin and more usually from around 17.5% to 22.5% tin, in addition to about 1% copper, .3% impurities and the balance aluminum. Aluminum alloys of the foregoing type have been found satisfactory for use as bearing material while alloys containing tin in amounts greater than 7% and preferably from about 15% to about 30% by weight are particularly suitable for this purpose. It will be understood that the term "aluminum strip" or "aluminum member" as employed in the specification and subjoined claims, is intended to encompass pure aluminum as well as aluminum alloys of the aforementioned type containing varying amounts of the conventional alloying constituents.

In accordance with the practice of the method comprising the present invention, a continuous steel strip indicated at 10 in FIGURE 1, is unwound from a roll 12 and is passed through a plating tank 14 while guidably supported by a plurality of guide rollers 16 whereupon one or both faces of the strip are provided with a plating of cobalt on the surfaces thereof. The plated steel strip thereafter is dried. An aluminum strip 18 is unwound from a supply roll 20 and is placed in overlying superimposed relationship on the steel strip such as by passing between a pair of guide rolls 22 from which the superimposed strips pass into a preheating oven or chamber 24. The heated strips upon exiting from the preheat chamber pass through a rolling assembly comprising an upper roll 26 disposed in contact with the aluminum strip and a lower roll 28 disposed in contact with the underside of the steel strip effecting a controlled compacting and solid phase bonding of the two strips together forming a composite strip indicated at 30, passing from the exit side of the compacting roll assembly.

The composite strip 30 may thereafter be passed through a heat-treat oven or chamber 32 depending on the type aluminum strip bonded wherein the composite strip is heated to a controlled elevated temperature for a preselected time period effecting stabilization or recticulation of the aluminum strip and the bond between the aluminum strip and underlying steel strip after which the heat treated composite strip may conveniently be wound into a storage roll indicated at 34. The storage roll 34 of the continuous composite strip is subsequently subjected to suitable blanking, stamping, metal forming and machining operations as may be required to manufacture shell-type bearings of the appropriate configuration and size.

In the preferred embodiment of the process as schematically illustrated in FIGURE 1, the steel and aluminum strips are continuously processed culminating in a finished composite strip. It will be appreciated that variations of the aforementioned process can occur such as, for example, plating the steel strip separately and thereafter employing the plated steel strip in a suitable coil form from which it is fed continuously directly into the preheat chamber 24. Alternatively, the cobalt plating can be applied to the aluminum strip although the deposition of cobalt on the steel strip is preferred. It is also contemplated within the scope of the present invention that only the steel strip is subjected to preheating in the preheat oven after which the aluminum strip is positioned in overlying relationship and is in itself heated to the appropriate temperature by conduction of heat from the steel strip. The composite strip exiting from the roll assembly or the heat treat chamber 32 may also be directly fed after cooling into suitable stamping and metal-forming equipment providing for further continuity of the process.

In either event, the steel strip after being appropriately cleaned, is subjected to a plating step wherein a plating of about 0.000025 up to about .0005 inch and preferably about 0.00005 inch, of cobalt or cobalt-phosphorus is applied to at least the face surface of the steel strip to be bonded to the aluminum strip. Coating thicknesses of less than about 0.000025 inch have been found to be inadequate for providing a sufficient barrier interlayer for achieving bonds of the requisite strength whereas thicknesses of the plating in excess of about 0.0005 inch have been found not to provide any significant improvement above that obtained with coating thicknesses of 0.0005 inch and the use of such thicker platings is conventionally uneconomical. It is for this reason that coating thicknesses within a range of about 0.000025 and 0.0005 inch are preferred.

The plating of cobalt can be achieved by conventional electrolytic means or alternatively by a catalytic or "electrodes" surface deposition producing a cobalt-phosphorus coating. Electrolytic deposited cobalt can be conveniently achieved in accordance with the techniques well known in the art employing an aqueous acid solution containing a cobalt salt in addition to suitable bath modifying constituents. A typical aqueous acid cobalt electroplating bath which can be suitably employed comprises 504 grams per liter of cobalt sulfate, 17 grams per liter of sodium chloride and 45 grams per liter of boric acid. The solution is adjusted to have a pH of about 5.2 and may be conveniently employed at a temperature of about 75° F. It has been found that by employing an electroplating bath of the foregoing composition, a period of about 85 seconds at a current density of about 40 amperes per square foot is required for depositing a cobalt plating on a steel surface of a thickness of 0.00005 inch.

A similar plating of cobalt-phosphorus can be suitably achieved by employing a solution containing such as, for example, 30 grams per liter cobalt chloride, 10 grams per liter sodium hypophosphite, 50 grams per liter ammonium chloride, and 100 grams per liter sodium citrate. The solution is adjusted to have a pH ranging between about 8 and 9 and when employed at a temperature of about 195° F. requires immersion times of about 5 minutes to deposit a cobalt phosphorus plating on the surfaces of steel of a thickness of about 0.00005 inch.

The cobalt plating on the steel strip is sufficiently oxidation resistant to enable the plated steel strip to be employed within a period of several days after deposition of the plating without any further surface treatment. In the event that the plated steel strip is not used for roll bonding to aluminum for a period of greater than a few days, it is usually desirable under such circumstances to subject the plated surface to a mild wire-brushing operation for example, to remove any oxide which may have formed from the cobalt plated surface.

The face surface of the aluminum strip to be bonded to the steel strip having the cobalt layer thereon is first cleaned so as to remove any grease, dirt or other contaminants therefrom and thereafter is subjected to a physical cleaning process such as wire brushing to remove any oxide film from its surface. Alternatively, suitable chemical cleaning techniques of the types well known in the art can be satisfactorily employed for this purpose.

The plated steel strip and the cleaned aluminum strip thereafter pass into a preheat chamber such as the chamber 24 as shown in FIGURE 1 wherein the strips are heated to a temperature of from about 300° F. up to about 950° F. in a suitable reducing atmosphere. When roll bonding aluminum or alloys of aluminum containing minor proportions of alloying constituents preheat temperatures of about 900° are preferred. When roll bonding aluminum-tin alloys containing low proportions of tin within a range of about 5% to 7% tin, preheat temperatures of about 800° F. are preferred. A reduction in the preheat temperature occasioned by the inclusion of relatively low melting alloying constituents such as tin, for example, is necessary in order to prevent exudation of the low melting constituent during the roll compacting operation. In the case of low tin content aluminum alloys, for example, it is not necessary that the preheat temperature be reduced to a level below the melting point of the low melting constituent. Satisfactory results are obtained by merely reducing the preheat temperature from about 900° F. to about 800° F. On the other hand, when relatively high tin containing aluminum alloys are to be bonded to steel such as those, for example, containing between about 15% up to about 30% tin, it is necessary to reduce the preheat temperature below the melting point of tin, namely, below about 450° F. to prevent excessive exudation of tin which segregates out of the aluminum-tin alloy and is present at the bond line in the molten metallic state interfering with the attainment of a high-strength bond. Accordingly, when bonding aluminum alloys containing relatively high percentages of low-melting alloy constituents, it is preferred to control the preheat temperature at a level slightly below the melting point of the low-melting constituent.

It is also preferred when bonding aluminum alloy strips containing relatively high percentages of low-melting point alloying constituents to preheat only the plated steel backing strip by passing it alone through the preheat chamber and thereafter superimposing the aluminum strip on the preheated steel strip effecting a heating of the aluminum strip to the appropriate temperature by conduction. In either event, the preheating of the superimposed aluminum and steel strips or alternatively, the plated steel strip alone, is achieved in a reducing atmosphere such as, for example an atmosphere obtained by the partial combustion of natural gas. Hydrogen atmospheres as well as cracked ammonia atmospheres, for example, can also be satisfactorily employed for this purpose. The use of a reducing atmosphere prevents the formation of oxides on the surfaces of the two strips to be bonded during the preheating operation.

After the preheating phase of the process, the steel strip and the aluminum strip superimposed thereon emerges from the furnace and passes immediately into the bight portion of the roll assembly preferably while still enveloped in the reducing atmosphere. The upper roll 26 and the lower roll 28 of the roll assembly are heated such as by means of heaters 36 as shown in FIGURE 1, to a temperature between about 200° F. and 600° F. during roll bonding of strips preheated between 300° F. and 950° F. When aluminum alloys containing relatively high percentages of low-melting point alloying constituents are to be bonded, it is preferred in such cases not to heat the rolls avoiding any further heating of the strip above its comparatively low preheat temperature which is controlled so as to be slightly below the melting point of the low-melting constituent.

The roll assembly, in accordance with the method as disclosed in United States Patent No. 3,078,563, preferably comprises one wherein the upper roll 26 disposed in contact with the aluminum strip is of a diameter less than one-half the diameter of the lower roll 28 disposed in contact with the underside of the steel strip. In accordance with this arrangement as set forth in the aforementioned United States patent, the upper roll 26 effects the exertion of a higher unit pressure on the aluminum strip effecting a substantially greater magnitude of deformation thereof in comparison to the pressure exerted on the steel strip. Accordingly, only a minimal degree of work hardening of the steel strip occurs conventionally not exceeding a hardness increase of 10 units as measured on the Rockwell B scale facilitating subsequent metal-forming operations to which the composite strip is subjected without encountering an excessive residual stress gradient in the finished article. The size of the upper roll 26 for optimum results is of a diameter as small as possible consistent with maintaining adequate strength and the avoidance of deformation thereof during roll compacting. Conventionally, ratios of the lower roll diameter to the upper roll diameter of two or more will provide satisfactory results while ratios greater than 5 are preferred.

Regardless of the specific nature of the roll assembly, the rolling operation for achieving a satisfactory bond between the aluminum strip and the steel strip is controlled so as to effect at least a 40% reduction in the thickness of the aluminum strip, and preferably a reduction of between about 50% and 75% of the thickness of the aluminum strip.

The resultant composite strip when comprised of an aluminum strip consisting essentially of pure aluminum or alloys of aluminum containing relatively low percentages of low-melting point alloying constituents such as, for example, up to about 7% tin can be employed directly for the manufacture of shell-type bearings and the like. It has been found that with aluminum alloys of the aforementioned type, the cobalt interlayer provides for a significant increase in the bond strength between the steel and aluminum strip requiring no further processing operations. On the other hand, when the aluminum strip comprises an alloy of aluminum containing relatively high percentages such as, for example, greater than 7%, and more usually from about 15% up to about 30% of a low-melting alloying constituent such as tin, for example, it is necessary in accordance with the second discovery comprising the present invention, to subject the composite strip to a controlled heat-treating cycle effecting a concurrent improvement in the strength of the bond and a refinement or reticulation of the aluminum alloy layer.

In order to achieve the benefits of improved bond strength of composite strips comprising an aluminum alloy containing more than 7% tin therein, for example, it is necessary to subject the composite strip to a heat treatment at a controlled temperature ranging from about 600° F. up to about 850° F. for a period of time to enable a reticulation and stabilization of the aluminum layer to occur in addition to an improvement in the strength of the bond between the aluminum strip and the steel strip. While temperatures within the range of from about 600° F. to about 750° F. have been found effective to achieve reticulation and refinement of the aluminum alloy layer, they are less effective in producing an improvement in the strength of the bond. Higher temperatures such as temperatures from about 750° F. up to about 850° F. and preferably between about 775° F. and 825° F. have been found particularly effective for producing a substantial increase in the strength of the bond while concurrently providing for reticulation and refinement of the structure of the aluminum layer. Temperatures above about 850° F. have been found to cause excessive melting of the low-melting constituent, particularly in the case of aluminum-tin alloys containing between 15% to 30% tin resulting in the presence of an excessive amount of tin at the bond line which interferes with the attainment of a bond of the requisite strength. It is for this reason that heat treatments of high-tin containing aluminum alloys are preferably carried out at a temperature between 775° F. and 825° F.

The duration of the heat treat cycle will vary dependent on the temperature employed. It has been found that durations as low as about 1 minute at a temperature of 600° F. will provide for a significant improvement in the bond strength and refinement of the aluminum layer. Heat treatment of a composite strip for a period of about a minute at a temperature between about 775° F. to about 825° F. has been found to provide a still further improvement in the bond strength and refinement of the aluminum layer in comparison to that attained at 600° F. for a similar time period. In order to assure adequate time at the preheat temperature for effecting bond improvement and reticulation of the aluminum layer, time periods of about 5 minutes are preferred whereas greater durations can be employed such as an hour, for example. Preheat durations in excess of about 10 minutes are usually commercially impractical and do not provide any significant improvements in bond strength and reticulation of the aluminum layer above that attained at about 5 minutes. It will be understood that the duration of heat treatment relates to that time at which the composite strip has attained a temperature within the preheat range of about 600° F. to about 850° F. and excludes the time interval necessary for heating the composite strip to that temperature and the subsequent cooling period for cooling the composite strip to room temperature. The composite strip at the completion of the roll bonding and/or heat treat cycle is allowed to air cool to room temperature and thereafter is in condition for use in the manufacture of bearings such as a flanged-type shell half bearing 38 illustrated in FIGURE 2. The flanged shell-type bearing shown in FIGURE 2 comprises an inner semi-cylindrical surface 40 composed of the aluminum or aluminum alloy and a pair of arcuate side flange 42 having a layer of the aluminum bearing material on the exterior face thereof.

In order to emphasize the high bond strength obtained in accordance with the method comprising the present invention, a series of tensile test specimens of the types illustrated in FIGURES 3 and 4 was prepared from composite strips and subjected to tensile forces to determine the bond shear strength between the aluminum and steel strip. Each tensile test specimen was of a width of 1 inch and was provided with a pair of transverse slots or grooves indicated at 44, extending through the aluminum strip 18 and the steel strip 10 respectively leaving an area indicated at 46 of approximately 0.020 inch wide corresponding to the bond area subjected to shear. A pair of apertures 48 was provided in opposite ends to facilitate gripping of the test specimen and applying a tensile force thereto.

A series of tensile test specimens was prepared from composite strips conveniently designated at A, B, C. Composite strip A comprised a steel strip having an electrolytic cobalt plating of .00005 inch thick thereon to which a substantially pure aluminum strip was bonded under roll pressure at a temperature of 900° F. incurring a reduction in the aluminum strip of about 50%. Composite strip B comprised the bonding of a low tin content aluminum alloy containing from about 5½% to about 7% tin, 1% copper, 1½% silicon, ½% nickel and the balance aluminum at a roll bonding temperature of about 800° F. to a steel backing strip having an electrolytic plating of cobalt thereon of a thickness of .00005 inch. Composite strip C comprised the product of bonding a high tin-aluminum alloy containing a nominal 20% tin, about 1% copper, up to .3% conventional impurities and the balance aluminum to a steel strip having an electrolytic plating of cobalt thereon of a thickness of 0.0005 inch which was roll bonded at a temperature of 430° F. effecting about a 60% reduction in the aluminum layer and thereafter heat treated for a period of 5 minutes at a temperature of about 800° F.

Tensile test data reflecting the shear rupture strength of the bonds produced on each of the test specimens are set forth in the following table:

BOND RUPTURE STRENGTH, p.s.i.

| Sample A | Sample B | Sample C |
| --- | --- | --- |
| 10,000 | 15,000 | 9,400 |
| 11,800 | 15,900 | 11,600 |
| 11,500 | 14,000 | 9,300 |
| 10,500 | 16,300 | 10,000 |
| 11,800 | 14,600 | 10,600 |
| 11,700 | 15,000 | 10,800 |
| 11,100 | | 9,300 |
| | | 10,800 |
| | | 10,300 |
| | | 9,400 |
| | | 10,900 |

It will be noted from the foregoing data that the bond rupture strength of the test specimens are substantially consistent indicating the uniformity and consistency by which high strength bonds are attained in accordance with the practice of the present invention. In comparison, test results obtained on test specimens prepared from a composite strip wherein an aluminum strip was bonded directly to a bare unplated steel surface produced bond rupture strength data ranging haphazardly between as low as 4,000 p.s.i. up to 10,000 p.s.i.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. The method of forming a composite aluminum and steel strip suitable for the manufacture of bearings which comprises the steps of depositing an integral coating selected from the group consisting of cobalt and cobalt phosphorus on the face surface of the steel strip in a thickness of from about 0.000025 to about 0.0005 inch, preheating said steel strip and an aluminum strip to be bonded to said face surface thereof in a reducing atmosphere to a temperature between about 800° F. up to about 950° F., and thereafter roll bonding said aluminum strip to said steel strip by passing the strips in superimposed relationship through a pair of rolls and effecting a reduction of at least 40% in the thickness of said aluminum strip.

2. The method of forming a composite strip comprising an aluminum alloy strip containing between about 15% up to about 30% tin and a steel strip which comprises the steps of depositing an integral coating of about 0.000025 to about 0.0005 inch thick selected from the group consisting of cobalt and cobalt phosphorus on the face surface of the steel strip, preheating said steel strip and said aluminum alloy strip in a reducing atmosphere to a temperature below about 450° F., roll bonding said aluminum alloy strip to said steel strip by passing the strips in superimposed relationship through a pair of rolls and effecting a reduction of at least 40% in the thickness of said aluminum alloy strip, and thereafter heat treating the resultant composite strip at a temperature of between about 775° to about 825° F. for a period of time sufficient to effect an improvement in the bond strength and a reticulation of the aluminum alloy.

References Cited

UNITED STATES PATENTS

| 2,611,163 | 9/1952 | Schaefer et al. | 22—200.1 |
| 2,795,040 | 6/1957 | Antel et al. | 29—502 X |
| 3,078,563 | 2/1963 | Gould et al. | 29—497.5 X |
| 3,093,885 | 6/1963 | Morrison et al. | 29—196.2 X |
| 3,195,991 | 7/1965 | Stern et al. | 29—497.5 X |

JOHN F. CAMPBELL, *Primary Examiner.*

R. F. DROPKIN, *Assistant Examiner.*